(12) United States Patent
Frith et al.

(10) Patent No.: US 9,207,420 B2
(45) Date of Patent: Dec. 8, 2015

(54) ENCLOSURE FOR FIBER OPTIC SPLITTER

(71) Applicant: Priority Electronics Ltd., Winnipeg (CA)

(72) Inventors: Kenton Frith, Ste Anne (CA); Blaine Henderson, Winnipeg (CA)

(73) Assignee: Priority Electronics Ltd., Winnipeg, MB (CA)

( * ) Notice: Subject to any disclaimer, the term of this patent is extended or adjusted under 35 U.S.C. 154(b) by 0 days.

(21) Appl. No.: 14/257,159

(22) Filed: Apr. 21, 2014

(65) Prior Publication Data

US 2015/0301298 A1 Oct. 22, 2015

(51) Int. Cl.
*G02B 6/00* (2006.01)
*G02B 6/44* (2006.01)

(52) U.S. Cl.
CPC ..................................... *G02B 6/4441* (2013.01)

(58) Field of Classification Search
CPC ........................... G02B 6/4441; G02B 6/4452
See application file for complete search history.

(56) References Cited

U.S. PATENT DOCUMENTS

| | | | | |
|---|---|---|---|---|
| 6,347,714 B1* | 2/2002 | Fournier et al. | ................. | 211/26 |
| 6,944,383 B1* | 9/2005 | Herzog et al. | ................. | 385/123 |
| 8,705,926 B2* | 4/2014 | Giraud et al. | ................. | 385/135 |
| 2008/0079341 A1* | 4/2008 | Anderson et al. | ............. | 312/287 |
| 2010/0166377 A1* | 7/2010 | Nair et al. | ..................... | 385/135 |
| 2014/0248028 A1* | 9/2014 | Campbell et al. | ............. | 385/135 |

* cited by examiner

*Primary Examiner* — Omar R Rojas
(74) *Attorney, Agent, or Firm* — Adrian D. Battison; Ade & Company Inc

(57) ABSTRACT

An enclosure cabinet for connecting optical fiber from a head end to each of the premises of multiple dwellings has a door on an opening in a front wall of the cabinet and a support member on top and bottom slides that supports both a compartment in a container for fiber optic splitter modules and a vertical support panel for premise drop components. The slide out support member moves from a position retracted within the hollow interior for closing of the door to an extended position where the vertical panel is presented at least partly forwardly of the front wall to allow unencumbered access to both sides of the panel where the premise drop components are installed across an opening in the panel for installation, testing and visual inspection.

1 Claim, 5 Drawing Sheets

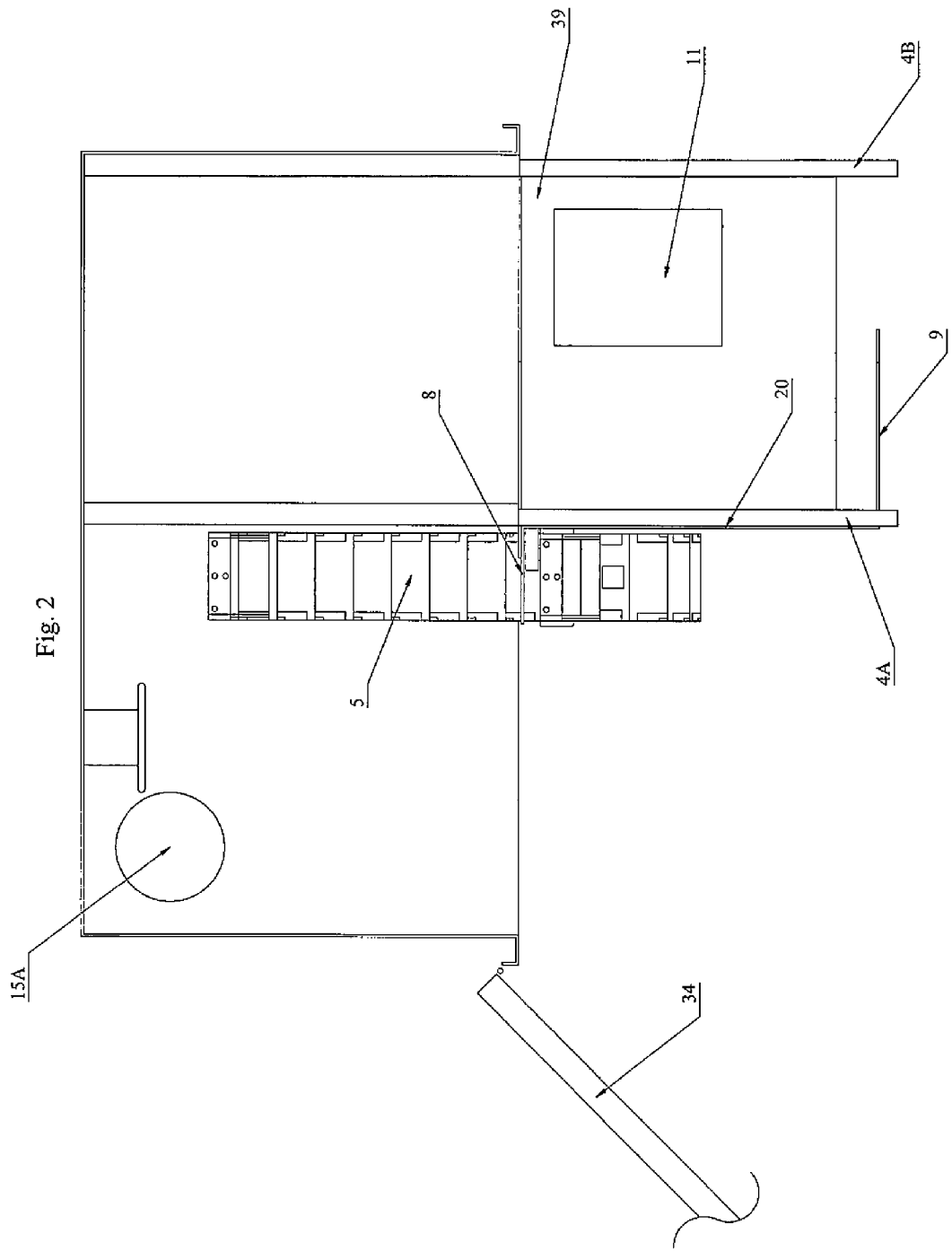

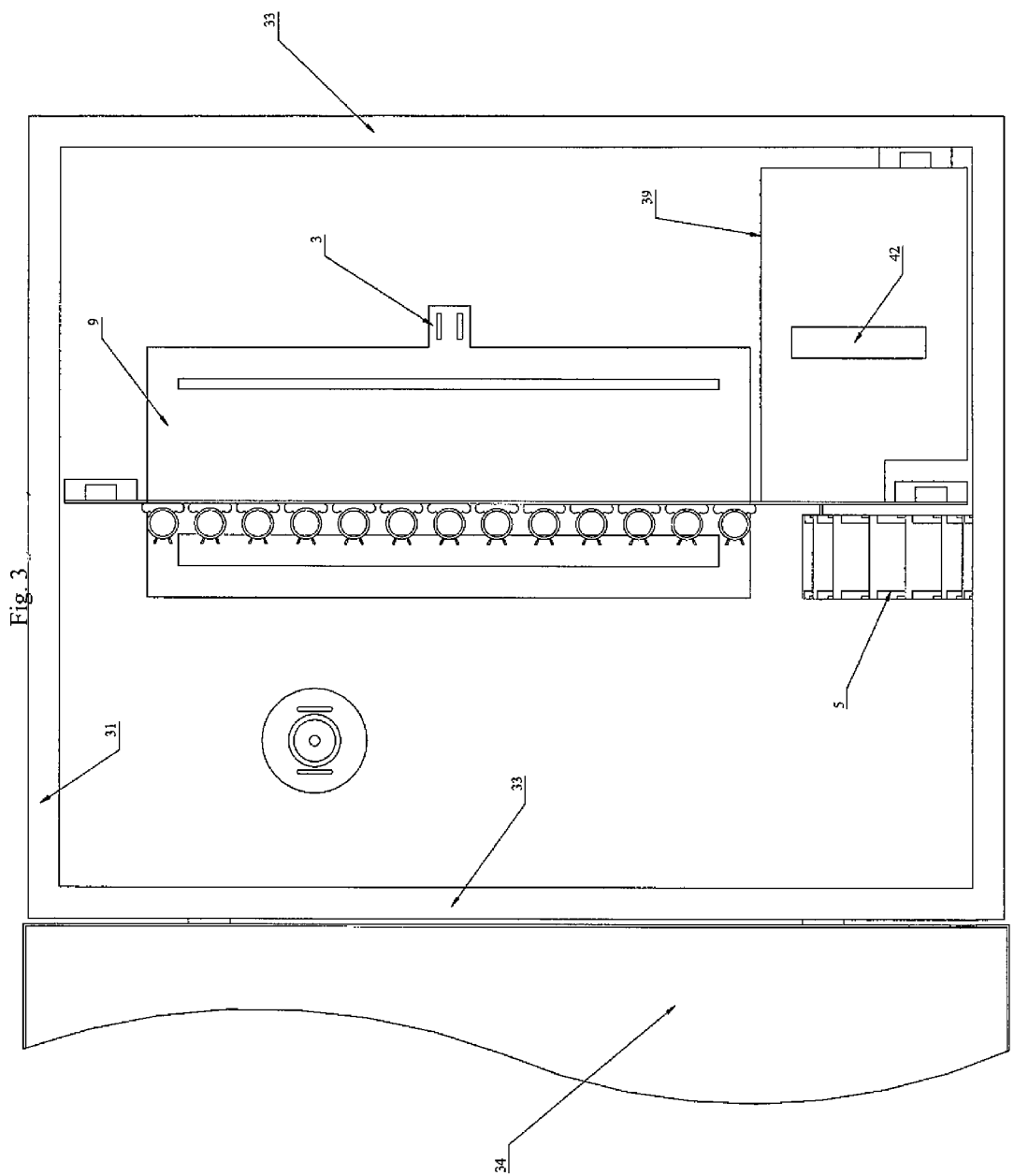

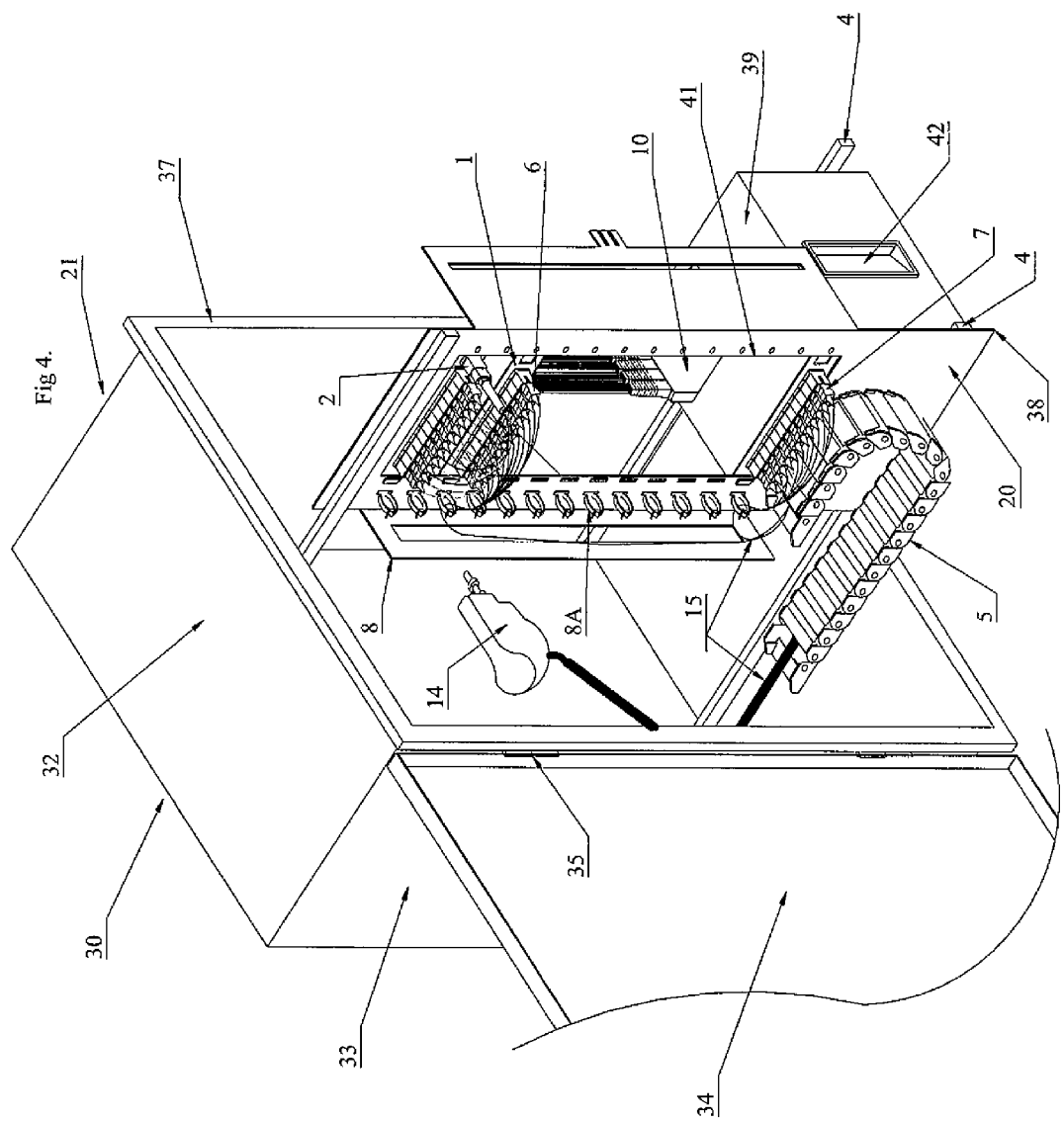

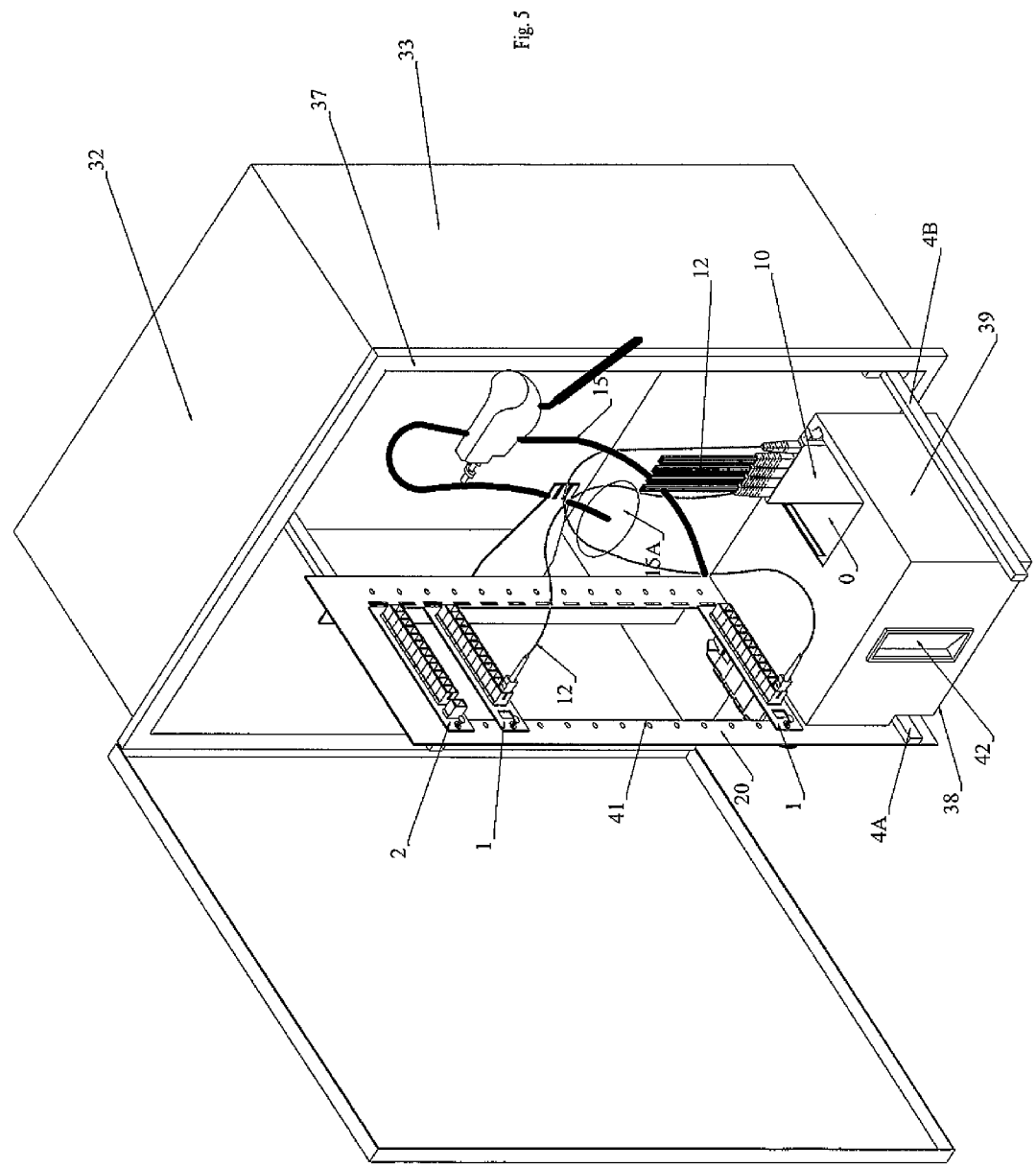

ENCLOSURE FOR FIBER OPTIC SPLITTER

This invention relates to an enclosure or housing for a fiber optic splitter and particularly to an enclosure designed to contain a splitter suitable for a multiple dwelling unit.

BACKGROUND OF THE INVENTION

Connector end-faces installed and housed in traditional multiple dwelling unit (MDU) enclosures have been difficult to inspect visually. The traditional enclosures do not typically allow sufficient space to insert a video inspection probe without impacting upon the sidewalls of the enclosure or bending previously installed fiber optic strands or splitter legs.

SUMMARY OF THE INVENTION

According to the invention there is provided a multiple dwelling unit enclosure for use in connecting optical fiber from a head end to each of the premises of the multiple dwellings, the enclosure comprising:

an outer housing defining a cabinet;

at least one door on an opening in a front wall of the cabinet allowing access from a front of the cabinet into a hollow interior of the cabinet;

a compartment for receiving a plurality of fiber optic splitter modules;

a support for a plurality of premise drop components;

and a slide out support member that supports both the compartment for the fiber optic splitter modules and the support for the premise drop components;

the slide out support member being mounted on slides which allow the support member to move from a position retracted within the hollow interior for closing of said at least one door to an extended position presented at least partly forwardly of the front wall to allow unencumbered access to the premise drop components for installation, testing and visual inspection.

Preferably the support for the plurality of premise drop components comprises a panel onto which the premise drop components are mounted so as to present opposite ends of the premise drop components on opposite sides of the panel.

Preferably the panel is vertical and arranged such that it lies in the extended position in a direction generally parallel to a direction of movement along the slides so that the panel defining a distribution bulkhead extends outwardly from the front opening of the enclosure at right angles to the front face.

Preferably the panel is spaced from both sides of the front opening so that there is space available on both sides as it returns into the enclosure.

Preferably the panel has an opening across which the premise drop components span so as to be fastened to the panel on opposed sides of the opening where the opening in the panel has a height so as to allow a stack of the premise drop components in the form of modular adapter plates to be mounted one on top of another.

Preferably the slide out support member includes a container portion defining the compartment where the container portion is attached to one side of the panel at a bottom of the panel.

Preferably the slides include bottom slide members which are attached to the slide out support member at the container portion and a top slide member attached to the panel.

Preferably there is provided a front fiber management bar and a rear fiber management bar carried on the slide out support member for guiding the fibers between the splitter modules and the premise drop components where the front fiber management bar is attached to a front edge of the panel and the rear fiber management bar is attached to a rear edge of the panel.

Each of the front fiber management bar and the rear fiber management bar includes hook/loop fabric guide elements mounted in slots therein where the hook/loop fabric guide elements act to manage the splitter legs provides a means to utilize a video inspection system that otherwise would not be feasible if a rigid fixed, plastic or metal routing arc was used.

Preferably the enclosure includes articulated cable management links connected between the enclosure and the slide out support member for carrying the fibers to minimize the potential for pinching or bending the fibers passing from the interior of the enclosure to the premise drop components where the articulated cable management links connect between the enclosure and the premise drop components at the panel on a side of the panel opposite the compartment for the fiber optic splitter modules.

BRIEF DESCRIPTION OF THE DRAWINGS

One embodiment of the invention will now be described in conjunction with the accompanying drawings in which:

FIG. 2 is a top plan view with the top panel removed of the enclosure of FIG. 1 with the components extended forwardly from the enclosure.

FIG. 3 is a front elevational view with the door open of the enclosure of FIG. 1 with the components retracted into the enclosure.

FIG. 4 is an isometric view from the front and one side of the enclosure showing primarily the internal components of the enclosure of FIG. 1 with the components extended forwardly from the enclosure and the door opened.

FIG. 5 is an isometric view from the front and the other side of the enclosure showing primarily the internal components of the enclosure of FIG. 1 with the components extended forwardly from the enclosure and the door opened and with the front management bar removed to enable components to be shown.

In the drawings like characters of reference indicate corresponding parts in the different figures.

DETAILED DESCRIPTION

Figure 1:
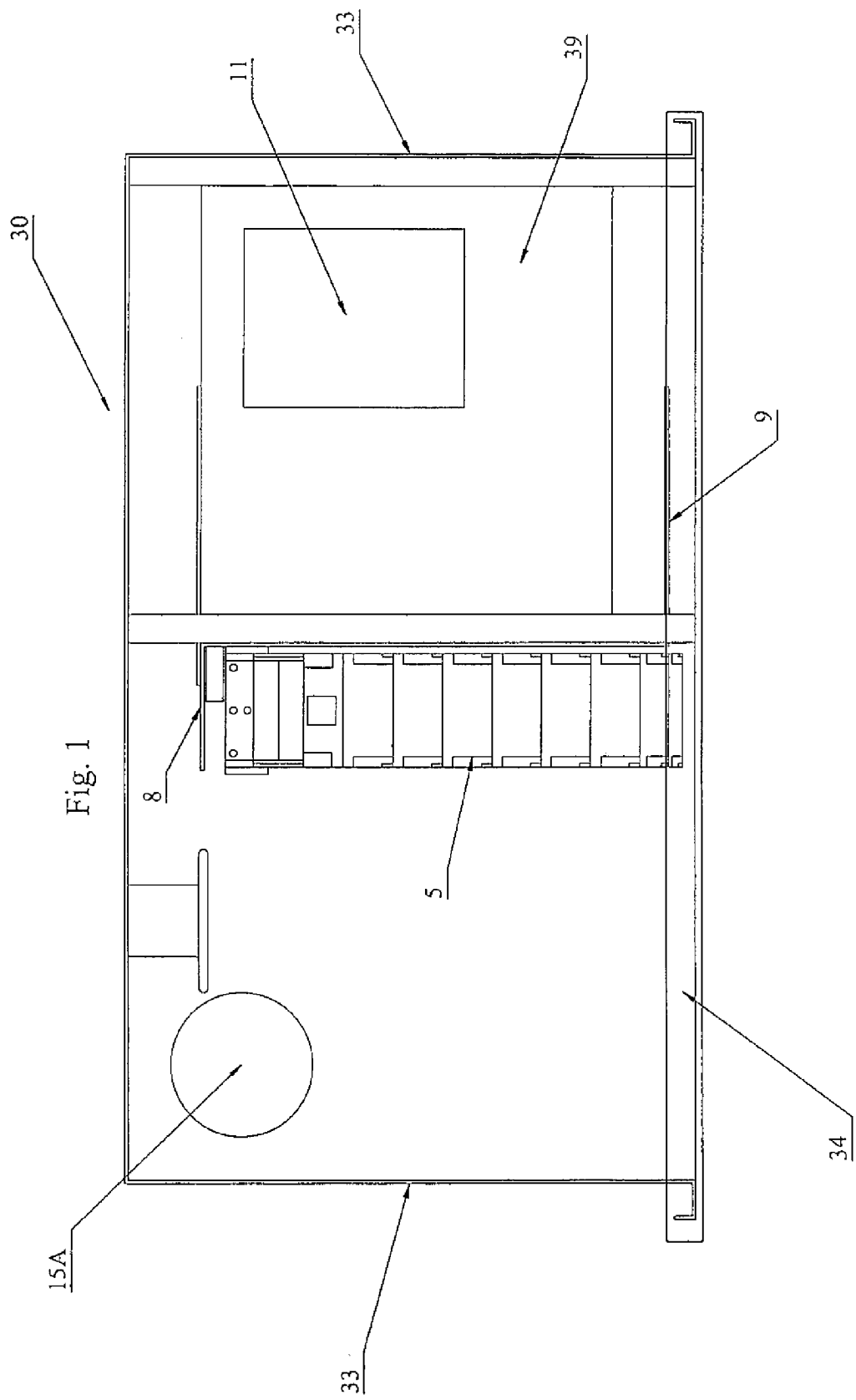
FIG. 1 is a top plan view with the top panel removed of an enclosure according to the present invention with the components retracted into the enclosure.

1—distributors 12 pack
2—multi-fiber push on (mpo) 12 pack
3—hook/loop fastener routing support
4—slides
5—articulated cable management links
6—customer premises drop fibers (field installable connector SCaps$_c$)
7—Feeder fiber optic ports
8—rear management bar
9—front management bar
10—splitter module
11—splitter compartment
12—output splitter legs
13—drop cable fiber optic strands
14—video inspection probe
15—inlet fiber
15A—entrance for fiber
20—side distribution plate/bulkhead
21—enclosure as a whole
30—cabinet 31—rectangular front edge
32—top panel
33—side panel
34—door panel
35—hinge
36—first side edge
37—second side edge
38—slide out tray
39—compartment
40—top opening in compartment
41—opening in bulkhead
42—handle to pull tray The figures show a multiple dwelling unit enclosure 21 which is provided for use in connecting optical fiber 15 from a head end (not shown) through an inlet 15A to each of the premises of the multiple dwellings connected at customer premises drop fibers 6 which are of the type known as field installable connector SCapc.

The enclosure comprises a main cabinet 30 defined by an outer housing including a top panel 32 and side panels 33 all defining a rectangular front edge 31 with first side edge 36 and second side edge 37. A door panel 34 is connected at hinges 35 to the first side edge 38 and closes against the second side edge at a suitable fastener to close the front edge 31. The single door 34 which can comprise a plurality of cooperating door panels closes the cabinet and can be opened from the front edge of the front wall of the cabinet allowing access from a front of the cabinet into a hollow interior of the cabinet 30.

Inside the cabinet is provided a compartment 39 for receiving a plurality of fiber optic splitter modules 10 which can be arranged side by side in a row within an opening 40 in a top wall of the compartment 39.

As part of the enclosure is provided a support in the form of a bulkhead 20 for a plurality of premise drop components 1. The vertical bulkhead 20 has an opening 41 where the components 1 are stacked on above the other and connected to the bulkhead on either side of the opening 41 at ends of the components 1. The opening 41 in the panel thus has a height so as to allow a stack of the premise drop components to be mounted one on top of another.

There is provided a slide out support member or tray 38 that supports both the compartment 39 for the fiber optic splitter modules 10 and the support bulkhead 20 for the premise drop components 1 in the form of modular adapter plates.

The slide out support member 38 is mounted on slides 4 including two bottom slides 4A and 4B and a top slide 4C which allow the support member to move when pulled by a handle 42 in a front wall of the compartment 39 from a position shown in FIG. 1 retracted within the hollow interior of the cabinet for closing of the door 34 to an extended position shown in FIG. 2 presented at least partly forwardly of the front wall 31 to allow unencumbered access to the premise drop components 1 for installation, testing and visual inspection.

The support 20 for the plurality of premise drop components comprises a panel or bulkhead onto which the premise drop components 1 are mounted so as to present opposite ends of the premise drop components on opposite sides of the panel that is on the left side of the bulkhead known as the drop side and also on the right side of the panel known as the splitter side.

The vertical panel or bulkhead is arranged such that it is parallel to the side walls of the cabinet and at right angles to the front face 31 so that it lies in the extended position in a direction generally parallel to a direction of movement along the slides 4 at a position is spaced from both sides 33 of the front opening 31.

The slide out support member 38 comprises the container portion defining the compartment 39 which is a rectangular body with a top wall in which the opening 40 is provided with the rectangular compartment being attached to one side of the panel 20 at the bottom of the panel 20. The slides 4 include the bottom slide members 4A, 4B which are attached to the slide out support member at the two sides of the rectangular container portion 39. The top slide member 4C is attached to the top of the panel 20.

A front fiber management bar 9 carried on the slide out support member for guiding is for guiding MPO assembly to the MPO-12 Pack. This is defined by a plate at the front of the slide out member bent at right angles to the bulkhead 20 to the right thereof across the front of the compartment 39. This plate includes hook/loop fabric guide elements mounted in slots in the routing support 3.

A rear fiber management bar 8 bent at right angles to a rear edge of the bulkhead 20 and extending to the left side is carried on the slide out support member and includes wire management arcs 8A for guiding the fibers from the articulated cable management links 5. The links 5 form a track which rolls to control the bending of the fibers carried by the rack out as the tray is pulled out on the slides. The arcs 8A support the wires extending from the forward end 5A of the links 5 to the distributors 1.

The use of hook/loop fabric guide elements acts to manage the splitter legs and provides a means to utilize a video inspection system that otherwise would not be feasible if a rigid fixed, plastic or metal routing arc was used.

The articulated cable management links 5 forming the track connected between the enclosure and the slide out support member on the left side of the panel opposite the compartment for the fiber optic splitter modules for carrying the fibers acts to minimize the potential for pinching or bending the fibers passing from the interior of the enclosure to the premise drop components 1.

The Multiple Dwelling Unit enclosure is provided which is designed to be used in fiber to the premise applications. The enclosure includes the slide out tray that supports both the required fiber optic splitter modules 10 and the required premise drop patch fields 6. The total number of premise drops required is provided utilizing modular adapter plate 12 Packs 1 and Modular Push-on packs (MPO-12) 2. By having the tray, complete with splitter modules and distribution drop patch-field slide out of the enclosure, unencumbered access to both sides of the patch-field is made available for installation, testing and visual inspection.

Incorporating the slide out tray facilitates access to both sides of the distribution bulkheads while at the same time keeping the overall enclosure dimensions small.

Additionally the use of a hook/loop fastener fabric strip 3 to manage the splitter legs provides a means to utilize a video inspection system that otherwise would not be feasible if a rigid fixed, plastic or metal routing arc was used.

The physical extension and retraction of the slide out tray is provided by the use of cabinet slides 4 carried on ball bearings.

Additionally the tray utilizes articulated cable management links 5 to minimize the potential for pinching or bending the fiber optic strands passing from the interior of the enclosure to the tray.

Drop cables 6 are routed to the ingress points on the enclosure from each customer premise or suite. Sufficient length is routed into the interior of the enclosure to pass from the ingress point to the rear of the drop patch-field bulkhead adapter, through the cable management links and up the rear management bar 8. The outer jacket of the drop cable 6 is removed leaving only the tight buffered 900 um OD fibers to be routed via the cable management bar 8 to the drop side of the tray. The outer jacket is removed shortly after the drop cable enters the enclosure. 900 um is passed through the management links and on to the drop bulkhead adapter.

Once routed to the appropriate distribution bulkhead the field installable connector 7 is installed and the bulkhead adapter 1, 2 populated. The fibers are secured to the rear management bar 8 with hook/loop fastener strips.

The front management bar 9 is used for securing the MPO cable assemblies when using the MPO-12 Pack distribution 12 Pack 2. This provides the option of moving 12 split signals via a 12 fiber MPO cable assembly. The diameter of a 12 fiber MPO assembly is typically 3 mm in diameter and reduces labor required to pull in multiple drops when servicing multiple premises on a single floor. The individual fibers can be broken out to service each customer suite once the cable has been pulled into a floor distribution panel.

Splitter Modules 10 are installed into the splitter side of the tray. They are inserted into the splitter module compartment 11 with the output legs 12 parked in a foam parking lot until required. The common, or input, leg is visually inspected and installed into the feeder fiber bulkheads typically installed at the bottom of the slide out tray. The splitter output legs are routed to the appropriate distribution bulkhead, visually inspected and installed. This provides continuity to the customer premise for high speed internet, phone and TV services.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A multiple dwelling unit enclosure comprising:
    a plurality of first optical fibers each connected to a respective one of the premises of the multiple dwellings;
    a plurality of second optical fibers each connected to a head end;
    an outer housing defining a cabinet having a top, a bottom, two sides and a front opening;
    at least one door on the front opening allowing access from a front of the cabinet into a hollow interior of the cabinet;
    a compartment for receiving a plurality of fiber optic splitter modules;
    a support for a plurality of premise drop components connected to a respective one of the first optical fibers;
    and a slide out support member that supports both the compartment for the fiber optic splitter modules and the support for the premise drop components;
    the slide out support member being mounted on slides which allow the support member to move from a position retracted within the hollow interior for closing of said at least one door to an extended position presented at least partly forwardly of the front wall to allow unencumbered access to the premise drop components for installation, testing and visual inspection;
    the support for the plurality of premise drop components comprising a vertical panel onto which the premise drop components are mounted so as to present opposite ends of the premise drop components on opposite sides of the panel;
    the vertical panel is maintained at right angles to the front opening and parallel to the sides between the sides;
    the slides including a top slide parallel to the plate attached to the top of the cabinet and along which a top of the panel slides from the retracted position to the extended position;
    the slides including a bottom slide parallel to the plate attached to the bottom of the cabinet and along which a bottom of the panel slides from the retracted position to the extended position;
    the panel having an opening across which the premise drop components span from one side of the opening to the other side in a plurality of stacked rows of the premise drop components with the premise drop components fastened to the panel on opposed sides of the opening;
    the panel including a container portion containing the compartment for the fiber optic splitter modules;
    the container portion being mounted at the bottom of the panel below the opening and extending from one side of the panel to an adjacent side of the enclosure;
    the slides including a side slide attached to the side of the cabinet and along which a side of the container portion slides from the retracted position to the extended position;
    a first cable management system on a first side of the panel opposite the container portion;
    a second cable management system on a second side of the panel adjacent the container portion;
    the first cable management system including articulated cable management links forming a track extending along the panel and connected at one end to the enclosure and at an opposed end to first side of the panel;
    the second cable management system comprising a plate attached to the panel above the container portion.

* * * * *